July 6, 1965 E. R. ZIEGLER 3,192,550
WIPER BLADE ASSEMBLY WITH FLUID DISTRIBUTOR
Filed April 10, 1964 2 Sheets-Sheet 1
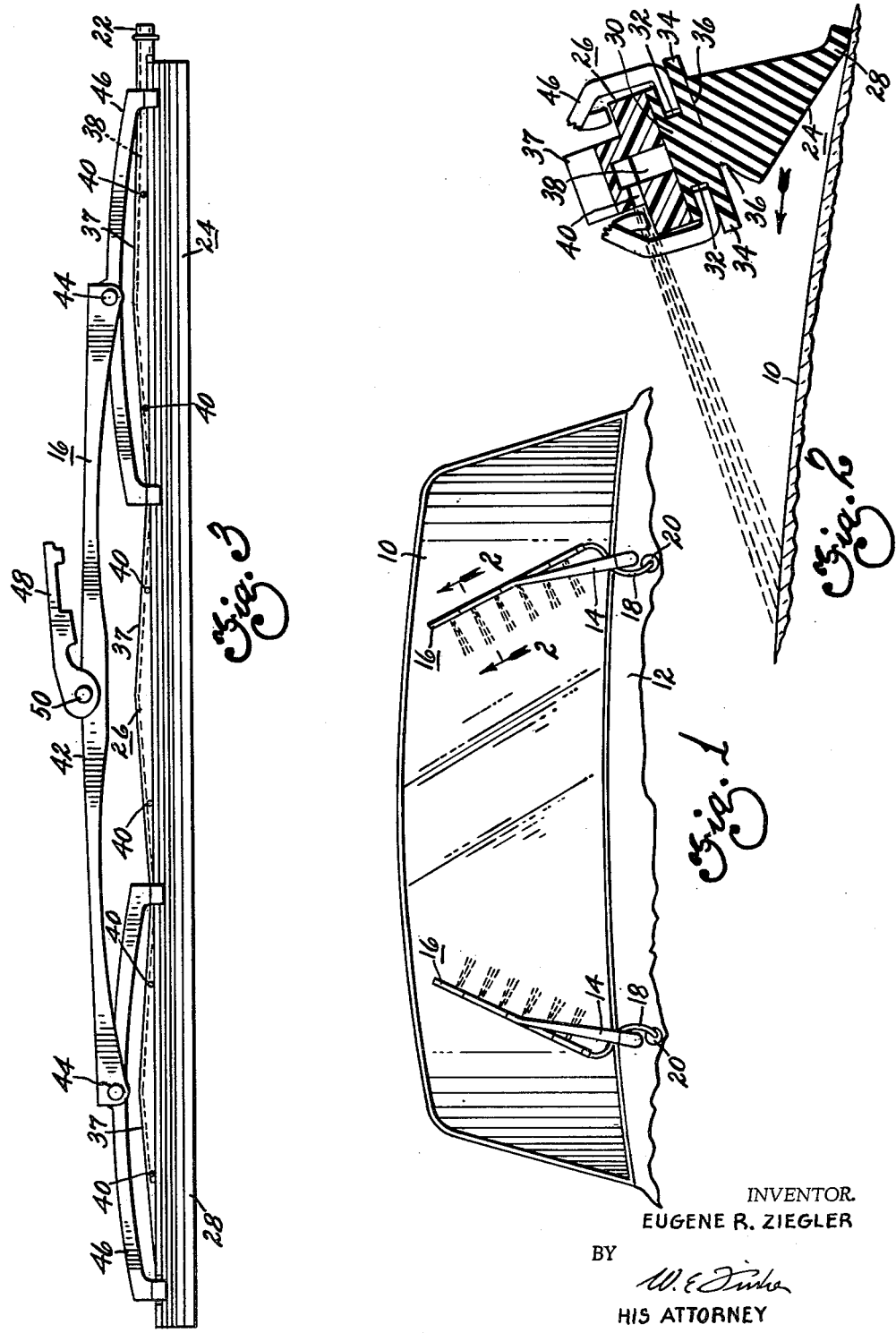
INVENTOR.
EUGENE R. ZIEGLER
BY
HIS ATTORNEY

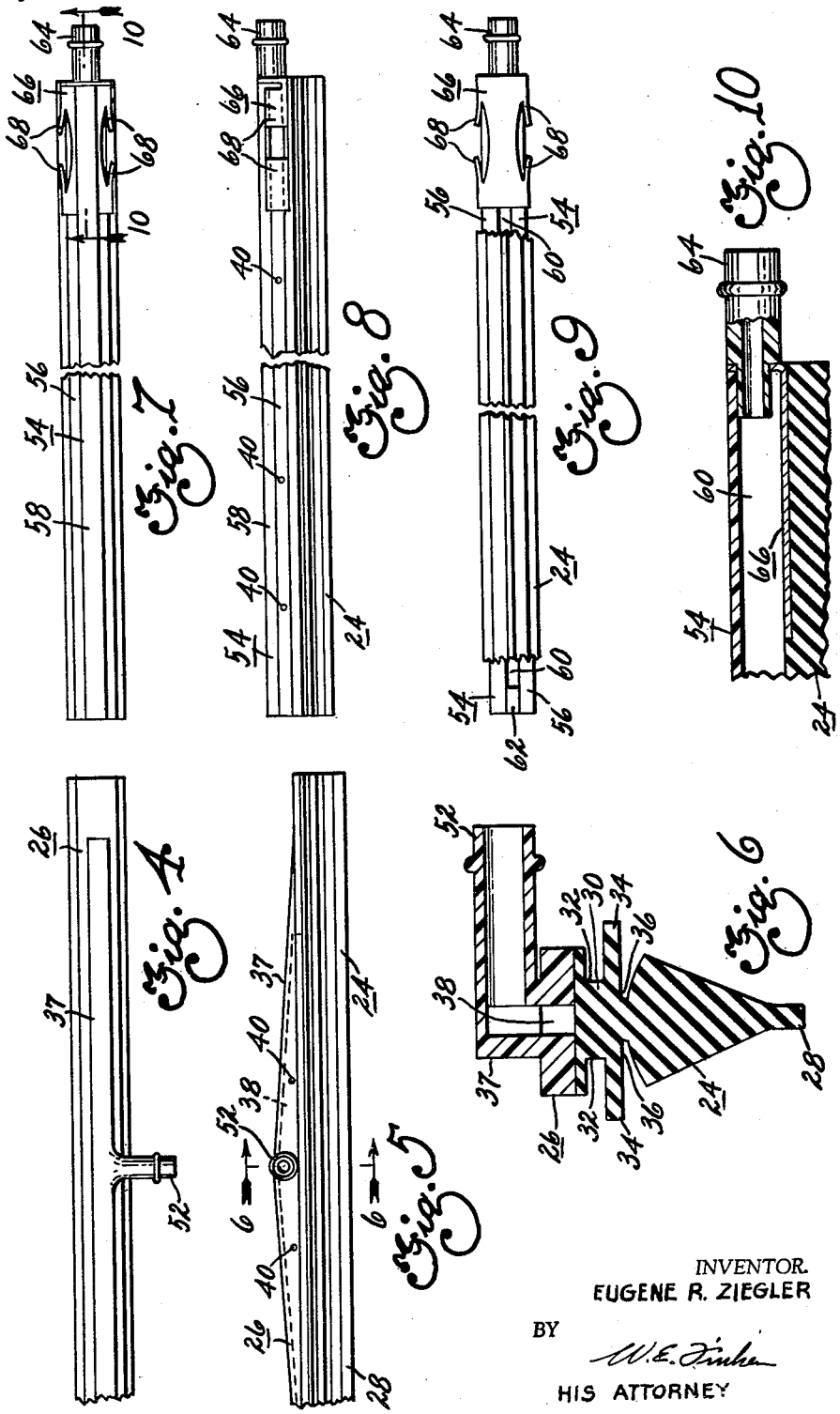

United States Patent Office 3,192,550
Patented July 6, 1965

3,192,550
WIPER BLADE ASSEMBLY WITH FLUID
DISTRIBUTOR
Eugene R. Ziegler, Spencerport, N.Y., assignor to General Motors Corporation, Detroit, Mich., a corporation of Delaware
Filed Apr. 10, 1964, Ser. No. 358,907
7 Claims. (Cl. 15—250.04)

This invention pertains to the art of windshield cleaning, and particularly to an improved squeegee and wiper blade assembly embodying an internal fluid channel for distributing liquid solvent along the length of the wiper blade onto the windshield for improving the effectiveness of the windshield cleaning mechanism.

At the present time the majority of motor vehicles are equipped with a windshield cleaning system comprising a wiper unit and a washer unit which can be operated conjointly so as to remove vision obscuring material from the outer surface of the windshield. However, in most intances the washer solvent is sprayed onto the windshield from fixed nozzles mounted on the vehicle forwardly of the windshield so as to direct the liquid solvent onto predesignated areas of the windshield which are traversed by the wiper blades. It is well known that during high speed driving, or under other conditions of high wind velocity, the stream of liquid solvent is dispersed, and in some instances, may not even reach the windshield thereby preventing the washer unit from performing its intended function of spraying liquid solvent onto the windshield.

Heretofore, it has been proposed to mount the spray nozzles on the windshield wiper arms so as to increase their proximity to the windshield, or to mount a fluid distributor along the length of the blade with spaced orifices directed towards the windshield in order to obviate the problem alluded to hereinbefore. The present invention is directed to an improved wiper blade assembly of the general type disclosed in Contant et al. Patent 3,097,389 wherein a fluid distributor channel is embodied in the plastic retention portion and is formed with a plurality of spaced orifices for directing liquid solvent onto the windshield throughout the length of the wiper blade. Moreover, preferably the liquid solvent is discharged in advance of the movement of the wiper blade during the inboard strokes of the wiper blades, this being achieved by the use of a washer pump driven by the wiper motor in accordance with the teachings of co-pending application S.N. 46,922 filed August 2, 1960, in the name of Bishoff, of common ownership. Accordingly, among my objects are the provision of an improved flexible squeegee embodying an integral plastic retention portion with a liquid distributor channel and spray orifice means; the further provision of a wiper blade assembly comprising a flexible squeegee having a plastic retention portion with a fluid distributor channel and spray orifice means therein; and a still further provision of a wiper blade assembly having an elastomeric squeegee and an extruded plastic retention portion with an integral fluid distributor channel and spray orifice means wherein one end of the fluid channel in the retention portion is plugged and the other end is connected to a hose coupling.

The aforementioned and other objects are accomplished in the present invention by constructing the plastic retention portion with a longitudinal groove on its bottom surface which is interconnected with a plurality of spaced spray orifices, and subsequently coextensively bonding the retention portion to the elastomeric squeegee so as to form an enclosed fluid distributor channel through which liquid solvent can be supplied and subsequently sprayed onto the windshield throughout the length of the wiper blade. Specifically, three embodiments of the improved wiper blade assembly are disclosed herein. In the preferred embodiment the retention portion comprises a plastic strip of substantially uniform cross sectional area throughout its length having an extruded slot in the bottom surface thereof. In modified embodiments the plastic retention portion is a non-uniform cross sectional area throughout its length with a groove molded in the bottom surface thereof terminating short of the ends thereof. One of the modified embodiments has a hose coupling connected to the heel end of the retention portion and another modification has a hose coupling connected to an intermediate part of the retention portion and extending transversely thereof.

Further objects and advantages of the present invention will be apparent from the following description, reference being had to the accompanying drawings, wherein preferred embodiments of the present invention are clearly shown, and wherein similar numerals depict similar parts throughout the several views.

FIGURE 1 is a fragmentary view, in elevation, depicting a portion of a vehicle showing the improved wiper blade assembly.

FIGURE 2 is an enlarged fragmentary sectional view taken along line 2—2 of FIGURE 1.

FIGURE 3 is a longitudinal view, in elevation, of an embodiment of the improved wiper blade assembly.

FIGURE 4 is a fragmentary plan view of another embodiment of the improved squeegee.

FIGURE 5 is a fragmentary side elevational view of the squeegee depicted in FIGURE 4.

FIGURE 6 is an enlarged sectional view taken along line 6—6 in FIGURE 5.

FIGURE 7 is a fragmentary plan view of a preferred embodiment of the improved squeegee.

FIGURE 8 is a fragmentary side elevational view of the preferred squeegee.

FIGURE 9 is a fragmentary view with certain parts broken away of the bottom elevation of the preferred squeegee.

FIGURE 10 is an enlarged fragmentary sectional view taken along line 10—10 of FIGURE 7.

Referring to FIGURE 1, a portion of a vehicle is shown including a windshield 10 and a cowl 12. A pair of spaced wiper arms 14 having spring hinge connected inner and outer sections are mounted on a pair of spaced oscillatable pivot shafts, not shown, extending through the cowl 12. The wiper arms 14 carry wiper blades 16 constructed in accordance with the present invention, and the wiper arm blade and arm assemblies are adapted to be conjointly oscillated in phase opposition across the windshield 10. As shown in FIGURE 1, each wiper blade 16 is connected by a flexible hose 18 to a hose fitting 20 mounted on the cowl and through which liquid solvent under pressure is delivered during operation of the washer unit, not shown.

Referring to FIGURES 2 and 3 in one embodiment of the improved wiper blade assembly each fluid supply hose 18 is adapted to be connected with an integral tubular extension, or hose coupling 22 projecting from the heel, or inner end of the wiper blade assembly 16. The wiper blade assembly 16 comprises an elastomeric body 24 which may be composed of rubber, and an elongate, stiff, but resiliently flexible retention portion 26 coextensive with and adhesively bonded to the body 24 to form a flexible squeegee. As seen particularly in FIGURE 2 the elastomeric body 24 has a flexible wiping lip 28 and an upstanding rib 30 along the opposite edge. A pair of coplanar grooves 32 are formed between the retention portion and flanges 34 on the elastomeric body for receiving the claws of the pressure applying superstructure to be described. In order to permit the wiping body to assume the requisite drag, or squeegeeing, position a pair of flexure grooves 36 are formed beneath the flanges 34.

As seen in FIGURES 2 and 3 the plastic retention portion 26, which is preferably composed of a plastic material known in the trade as "Delrin," has a greater width than thickness so as to be substantially rigid in a plane parallel to the surface to be wiped while remaining resiliently flexible in a plane normal to such surface. Moreover, in order to obtain a substantially uniform distribution of applied wiper arm pressure the retention portion 26 is of non-uniform thickness throughout its entire length this being accomplished by the formation of interconnected and aligned upstanding ribs 37 on the upper surface of the retention portion between the marginal edges thereof. The ribs 37 are of varying thickness and taper substantially uniformly from the center towards both ends. The hose coupling 22 is formed as an integral part of the heel rib 37. Moreover, as seen in FIGURES 2 and 3 a liquid solvent distributing channel 38 is formed in the retention portion 26 in alignment with the ribs 37. One marginal edge of each rib 37 has a pair of spaced spray orifices 40 connecting with the channel 38. The bottom wall of the channel 38 is closed by the upstanding rib 30 of the elastomeric body 24 which is adhesively bonded thereto.

The pressure applying superstructure for the wiper blade assembly may be of any known type, and thus may comprise a plurality of pivotally interconnected yokes, a plurality of stacked levers, or a combination of both. In the illustrative embodiment disclosed the pressure applying superstructure comprises a primary yoke 42 having its ends pivotally connected at 44 to a pair of channel shaped secondary yokes 46. A wiper arm attaching clip 48 is pivotally connected at 50 to the center of the primary yoke 42. The ends of the secondary yokes 46 are formed with claws that straddle the marginal edges of the retention portion 26 as shown in FIGURES 2 and 3 and permit slight rocking movement of the squeegee relative to the superstructure. The outer end of the tip yoke 46 may be detachably interlocked with the retention portion 26 in a manner disclosed in the aforementioned Patent 3,097,389.

In operation, when the washer unit is activated conjointly with the wiper unit, liquid solvent will be intermittently pumped through the hoses 18 to the wiper blades 16. This fluid will enter the channels 38 through the couplings 22 and thereafter be sprayed through the orifices 40 on the inboard strokes of the wiper blades directly onto the windshield 10 and in advance of the movement of the wiper blades thereacross as depicted in FIGURE 2. By conveying the liquid solvent directly to the wiper blade and distributing it throughout the length thereof, the effects of wind dispersion are substantially obviated.

Referring to FIGURES 4 through 6 a further modified embodiment of the improved squeegee is disclosed wherein the hose coupling to the wiper blade is located adjacent the heel and extends transversely relative to the retention portion instead of in axial alignment therewith as shown in FIGURE 3. In all other respects the wiper blade assembly depicted in FIGURES 4 through 6 is identical with that described in conjunction with FIGURES 2 and 3. Thus, the hose coupling 52 is again formed integral with the retention portion 26 and is aligned with the apex of the heel, or innermost, upstanding rib 37 thereon. The hose couplings 52 for the left and right-hand wiper blades will be arranged so that they extend toward the cowl 12 of the vehicle when the wiper blades are at their parked positions adjacent the lower reveal molding of the windshield. Operation of the modified embodiment shown in FIGURES 4 through 6 will be the same as previously described in connection with the first embodiment.

Referring to FIGURES 7 through 10, in the preferred embodiment of the present invention the plastic retention portion 54 has a uniform cross sectional area throughout its length and comprises a relatively wide base 56 and an upstanding rib 58 with the fluid distributor channel 60 therein. Since the retention portion 54 is of uniform cross section it can be made by an extrusion process. One end of the channel 60 is closed by a plug 62 and a hose coupling, or nipple, 64 is press-fitted into the other end of the channel. Spray orifices 40 are formed in one marginal edge of the base 56 of the retention portion. The elastomeric body 24 is adhesively bonded to the bottom surface of the retention portion 54 to close the channel 60. In addition, a sheet metal locking clip 66 is attached to the heel end of the retention portion 54 prior to bonding the elastomeric body 24 thereto. The sheet metal clip 66 is generally U-shaped in cross section with flanged upper edges that overlie the marginal edges of the base 56. The marginal edges of the clip 66 are formed with spaced-apart spring fingers, or tangs, 68 which are adapted to receive the heel end claw of a secondary yoke 46 for the pressure applying superstructure so as to establish a releasable interlock between the pressure applying superstructure and the squeegee comprising the body 24 and the retention portion 54.

The operation of the preferred embodiment is the same as that previously described inasmuch as when the washer unit is activated conjointly with the wiper unit liquid solvent will be supplied to the channel 60 and sprayed onto the windshield through the spray orifices 40 in advance of the wiper blades during their inboard strokes.

While the embodiments of the present invention as herein disclosed constitute preferred forms, it is to be understood that other forms might be adopted.

What is claimed is as follows:

1. A squeegee comprising an elongate, freely flexible body of elastromeric material having a wiping lip along one edge, a stiff, resiliently flexible plastic retention portion coextensively bonded to the opposite edge of said elastometric body, said retention portion having a liquid distributor channel therein substantially coextensive with the length thereof with one wall formed by said body of elastometric material, a plurality of spray orifices in said retention portion connected with said fluid distributor channel and extending laterally therefrom, and coupling means for connecting said channel with a source of pressurized liquid solvent to cause the liquid solvent to be delivered through said orifices onto a surface to be cleaned.

2. A squeegee comprising an elongate, freely flexible body of elastomeric material having a wiping lip along one edge and an upstanding rib along the opposite edge, a stiff, resiliently flexible plastic retention portion coextensively bonded to said upstanding rib, said retention portion having upstanding rib means and a fluid distributor channel therein disposed between the marginal edges thereof and extending into said rib means and having one wall formed by said elastomeric body, a plurality of spaced-apart spray orifices in said retention portion connected with and extending laterally from said fluid distributor channel, and coupling means for supplying pressurized liquid solvent to said channel for delivery onto a surface to be cleaned through said spray orifice.

3. The squeegee set forth in claim 2 wherein said rib means comprises a plurality of interconnected and aligned ribs of non-uniform thickness whereby said retention portion is non-uniformly flexible in a plane parallel to the surface to be wiped, the thickness of each rib being a maximum adjacent its center and progressively decreasing to a minimum at its ends.

4. The squeegee set forth in claim 3 wherein said coupling means is integral with said retention portion and is in axial alignment with the fluid channel therein, and wherein said spray orifices are formed in the side walls of said aligned ribs.

5. The squeegee set forth in claim 3 wherein said coupling means is integral with one upstanding rib of said retention portion and extends transversely thereof, and wherein said spray orfices are formed in the side walls of said aligned ribs.

6. The squeegee set forth in claim 2 wherein said rib means comprises an upstanding rib of uniform thickness coextensive with said retention portion, and wherein said spray orifices are located in a marginal edge of said retention portion spaced from said rib.

7. The squeegee set forth in claim 6 wherein one end of said fluid distributor channel in said retention portion is closed by a plug, and wherein said coupling means is press-fitted into the other end of said channel.

References Cited by the Examiner
UNITED STATES PATENTS

| | | | |
|---|---|---|---|
| 2,059,224 | 11/36 | French | 15—250.04 |
| 2,918,689 | 12/59 | Pruett | 15—250.04 |
| 3,097,389 | 7/63 | Contant et al. | 15—250.42 |

FOREIGN PATENTS 544,311    1/56   Belgium.

CHARLES A. WILLMUTH, *Primary Examiner*.